United States Patent
Rainone et al.

(10) Patent No.: US 10,512,227 B2
(45) Date of Patent: Dec. 24, 2019

(54) WATER FLOW MANAGEMENT SYSTEMS AND METHODS

(71) Applicant: H₂O FLOW PRO, LLC, Tyler, TX (US)

(72) Inventors: Michael Rainone, Palestine, TX (US); Samuel A. Sackett, Frankston, TX (US); Daniel Frederick Warns, Palestine, TX (US); Adam Collin Vance, Palestine, TX (US); Bret Arthur Berry, Tyler, TX (US)

(73) Assignee: H2O FLOW PRO, LLC, Tyler, TX (US)

( * ) Notice: Subject to any disclaimer, the term of this patent is extended or adjusted under 35 U.S.C. 154(b) by 381 days.

(21) Appl. No.: 14/821,431

(22) Filed: Aug. 7, 2015

(65) Prior Publication Data

US 2016/0037736 A1  Feb. 11, 2016

Related U.S. Application Data

(60) Provisional application No. 62/035,278, filed on Aug. 8, 2014.

(51) Int. Cl.
| | |
|---|---|
| *A01G 25/16* | (2006.01) |
| *G05B 19/04* | (2006.01) |
| *G05B 19/042* | (2006.01) |
| *G05B 15/02* | (2006.01) |
| *G05B 9/02* | (2006.01) |

(52) U.S. Cl.
CPC ......... *A01G 25/16* (2013.01); *G05B 19/0426* (2013.01); *G05B 19/0428* (2013.01); *G05B 2219/25419* (2013.01); *G05B 2219/2625* (2013.01)

(58) Field of Classification Search
CPC .... A01G 25/16; A01G 25/162; A01G 25/165; G05B 19/0426; G05B 19/0428; G05B 2219/2625; G05B 2219/25419; G05B 15/02; G05B 9/02; G05B 2219/23435
USPC .......................................................... 700/284
See application file for complete search history.

(56) References Cited

U.S. PATENT DOCUMENTS

| | | |
|---|---|---|
| 3,723,753 A | 3/1973 | Davis |
| 4,007,458 A | 2/1977 | Hollabaugh |
| 4,209,131 A | 6/1980 | Barash et al. |
| 5,048,755 A | 9/1991 | Dodds |
| 5,139,044 A | 8/1992 | Otten et al. |
| 5,333,785 A | 8/1994 | Dodds et al. |
| 6,997,642 B2 | 2/2006 | Bishop, Jr. |

(Continued)

*Primary Examiner* — Michael J Brown
(74) *Attorney, Agent, or Firm* — Nixon & Vanderhye P.C.

(57) ABSTRACT

Embodiments of the present disclosure provide systems and methods for controlling water flow in a water distribution system (e.g., irrigation system). In an irrigation system, an interrupt controller receives control signals from an irrigation controller and data from sensors disposed in the irrigation system, and modifies operations of components in the irrigation system based on the sensor data. The sensor data is analyzed to determine conditions in the irrigation system. Based on the analysis, the operation of the irrigation system is interrupted or modified to optimize the supply of water. The interruption or modification of the operation of the irrigation system allows detected abnormal conditions to be investigated and corrected.

23 Claims, 4 Drawing Sheets

(56) References Cited

U.S. PATENT DOCUMENTS

| | | | |
|---|---|---|---|
| 7,123,993 B1* | 10/2006 | Freeman | A01G 25/16 239/63 |
| 7,264,177 B2 | 9/2007 | Buck et al. | |
| 7,658,336 B2 | 2/2010 | Kates | |
| 7,789,321 B2 | 9/2010 | Hitt | |
| 7,930,069 B2 | 4/2011 | Savelle, Jr. et al. | |
| 8,215,570 B2 | 7/2012 | Hitt | |
| 8,245,720 B2 | 8/2012 | Grill et al. | |
| 8,565,927 B1* | 10/2013 | Campbell | A01G 25/167 111/118 |
| 2002/0002425 A1 | 1/2002 | Dossey et al. | |
| 2005/0090936 A1* | 4/2005 | Hitt | A01G 25/167 700/284 |
| 2005/0171646 A1* | 8/2005 | Miller | A01G 25/16 700/284 |
| 2005/0199842 A1 | 9/2005 | Parsons et al. | |
| 2005/0267641 A1* | 12/2005 | Nickerson | A01G 25/16 700/284 |
| 2006/0157580 A1 | 7/2006 | Regli | |
| 2007/0029401 A1 | 2/2007 | Kaen | |
| 2009/0039173 A1 | 2/2009 | Mammon | |
| 2010/0152909 A1* | 6/2010 | Hitt | A01G 25/167 700/284 |
| 2010/0256827 A1* | 10/2010 | Bragg | A01G 25/165 700/284 |
| 2011/0093123 A1* | 4/2011 | Alexanian | A01G 25/16 700/284 |
| 2011/0190947 A1* | 8/2011 | Savelle, Jr. | G05D 11/02 700/284 |
| 2011/0309274 A1 | 12/2011 | Parsons et al. | |
| 2012/0037725 A1* | 2/2012 | Verfuerth | A01G 25/16 239/289 |
| 2012/0239211 A1* | 9/2012 | Walker | A01G 25/16 700/284 |
| 2012/0261487 A1 | 10/2012 | Palmer et al. | |
| 2012/0273587 A1 | 11/2012 | Hitt | |
| 2013/0226357 A1 | 8/2013 | Ersavas et al. | |
| 2013/0310992 A1 | 11/2013 | Larsen | |
| 2014/0110498 A1 | 4/2014 | Nelson et al. | |
| 2014/0129039 A1 | 5/2014 | Olive-Chahinian et al. | |
| 2014/0130878 A1 | 5/2014 | Marinez | |
| 2014/0172180 A1 | 6/2014 | Woytowitz et al. | |
| 2014/0222223 A1 | 8/2014 | Horton et al. | |
| 2015/0100168 A1* | 4/2015 | Oliver | A63F 13/245 700/284 |
| 2015/0319941 A1 | 11/2015 | Klein et al. | |
| 2015/0327449 A1 | 11/2015 | Bartlett et al. | |
| 2016/0057949 A1* | 3/2016 | Williams | A01G 25/167 700/284 |

\* cited by examiner

100

200

300

500

WATER FLOW MANAGEMENT SYSTEMS AND METHODS

CROSS-REFERENCES TO RELATED APPLICATIONS BACKGROUND

The present application claims priority to U.S. Provisional Application No. 62/035,278, filed on Aug. 8, 2014, the entirety of which is incorporated by reference herein.

BACKGROUND

The subject matter of this application is directed to water flow management systems and more specifically to an interrupt controller providing control signals based on signals received from wireless sensors.

Programmable irrigation controllers allow users to create an irrigation schedule for a plurality of zones in an irrigation system. The programmable irrigation controllers may allow a user to specify start time and stop time for each zone and on which days the watering should be performed.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

The exemplary embodiments are directed to a controller that receives data from wireless sensors disposed in an irrigation system and based on the sensor data controls operations of components in the irrigation system. The sensor data is analyzed to determine conditions in the irrigation system. The determined conditions may include conditions of the soil, condition of the irrigation system, current weather related conditions, and predicted weather conditions. Based on the analysis, the operation of the irrigation system may be interrupted or modified to optimize the supply of water. The interruption or modification of the operation of the irrigation system may allow detected abnormal conditions to be investigated and corrected. In addition, extensive damage to property and/or waste of water may be prevented. The controller according to embodiments of the present disclosure may be added to existing systems already including an irrigation controller controlling the operation of the irrigation system.

Figure 1:
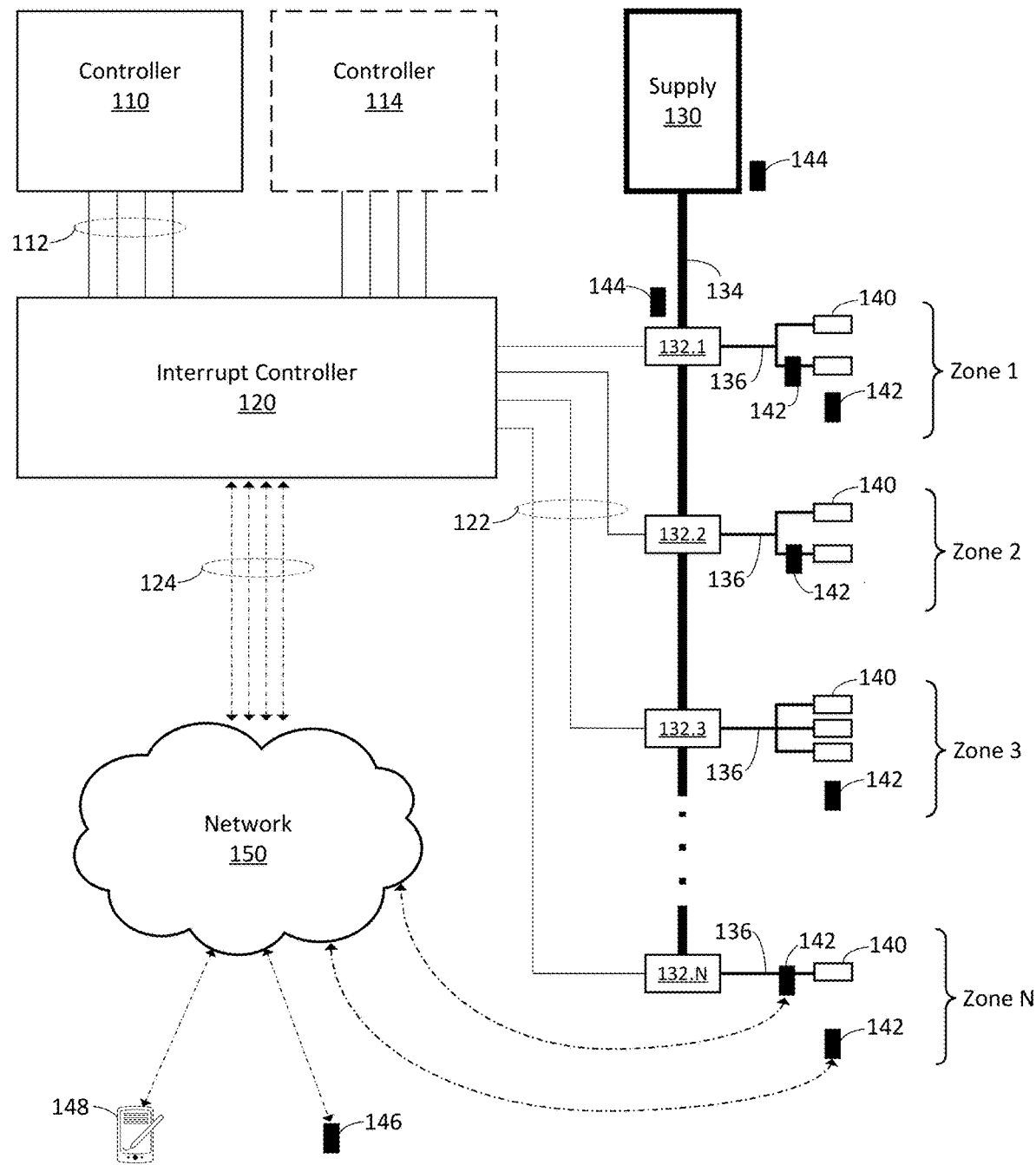
FIG. 1 illustrates an irrigation system according to an embodiment of the present disclosure.

FIG. 1 illustrates an irrigation system 100 according to an embodiment of the present disclosure. The irrigation system 100 may include a main controller 110, an interrupt controller 120, control lines 112 and 122, a supply 130, a plurality of control devices 132.1-N, a main supply line 134, a plurality of branch supply lines 136, a plurality of irrigation devices 140, and/or sensors 142. The irrigation system 100 may also include additional sensors 144 and 146, remote control device(s) 148 and/or a network 150.

The main controller 110 may be coupled to the plurality of control devices 132.1-N via control lines 112 and 122. An interrupt controller 120 may be disposed between the control lines 112 and 122. The plurality of control devices 132.1-N may couple the supply 130 to the plurality of irrigation devices 140 via the main supply line 134 and the branch supply lines 136. The sensors 142 may be provided in the vicinity of the plurality of irrigation devices 140 or may be provided as part of the plurality of irrigation devices 140. The additional sensor(s) 144 may be provided in the vicinity of or as part of the other devices in the irrigation system 100. The additional sensor(s) 146 may be provided outside of the vicinity of the devices which are part of the irrigation system 100.

The main controller 110 may generate control signals to control the operation of the plurality of control devices 132.1-N. Based on the control signals, the control devices 132.1-N may regulate the flow of water between the supply 130 and the irrigation devices 140. The interrupt controller 120 may be provided between the controller 110 and the plurality of control devices 132.1-N to receive the control signals via control lines 112 from the controller 110 and to output control signals via control lines 122 to the plurality of control devices 132.1-N. The interrupt controller 120 may interrupt the transmission of the received control signals to the plurality of control devices 132.1-N. The interrupt controller 120 may interrupt the transmission of the received control signals based on data received from one or more of the sensors 142, 144, and 146 and/or other remove control device(s) 148. In response to the interruption of the control signals, the operation of the plurality of control devices 132.1-N may change from the operation intended by the control signals provided by the controller 110.

In another embodiment, the interrupt controller 120 may modify the received control signals and output modified control signals. The interrupt controller 120 may modify the received control signals based on data received from one or more of the sensors 142, 144, and 146 and/or other remove control device(s) 148. In response to the modified control signals, the operation of the plurality of control devices 132.1-N may change from the operation intended by the control signals provided by the controller 110.

The main controller 110 may be an irrigation controller configured to activate and/or deactivate the control devices 132.1-N to control the flow of water from the supply 130 to the irrigation devices 140. The controller 110 may be a zone-based programmable irrigation controller regulating the supply of water to predefined zones (zones 1-N) based on a predefined schedule. For example, the controller 110 may be programmed to actuate (e.g., to turn on) the control device 132.1 while the remaining control devices 132.2-N are deactivated (e.g., turned off) during a predefined period of one or more time increments (minutes, hours, days). When the control device 132.1 is actuated, water may be provided from the supply 130 to the irrigation devices 140 part of zone 1. After one zone is watered, based on the programmed schedule, the controller 110 may send a control signal (or stop sending a control signal) to deactivate the control device 132.1 and send a control signal to another one of the control devices 132.2-N to water the next zone. According to one embodiment, only one zone may be activated at any one time. The controller 110 may include controls and/or a display to allow a user to create and/or modify the irrigation schedule.

The water supply 130 may be a source of water for the irrigation system 100. The water supply 130 may be supply line provided by the utility company, a natural water source (e.g., a well, spring, pond or a lake) or a water storage facility. The water supply 130 may include one or more water pressure regulators to regulate the water pressure at the main line and/or the control devices 132.1-N. The water supply 130 may include a system to add minerals and/or fertilizers to the water supply being distributed to the zones 1-N.

The control devices 132.1-N may include switchable valves that control the flow between the main supply line 134 and the branch supply lines 136. The control devices 132.1-N may include solenoid operated water valves receiving on/off commands from the controller 110 and/or the interrupt controller 120. According to one embodiment, the control devices 132.1-N may turn on to allow flow when receiving a predefined control signal (e.g., a 24 VAC control signal) and may turn off to prevent flow when the predefined control signal (e.g., 24 VAC control signal) is discontinued. In other embodiments, the control devices 132.1-N may receive digital control signals (e.g., encoded signals) to turn on and turn off the control devices 132.1-N. With this embodiment the control devices 132.1-N may receive power from another source to operate the control devices 132.1-N. With this embodiment the control devices 132.1-N may include decoders to decode the digital signal and a control circuit to turn on/off the control device(s) based on the decoded signal.

As shown in FIG. 1, each Zone 1-N may be associated with a respective control device 132.1-N. In other embodiments (not shown in FIG. 1), a plurality of control devices may be grouped to provide flow to a specific zone via multiple control devices. As discussed above, according to one embodiment, only one zone may be activated at any one time. Thus, according to one embodiment, a single control device may be activated at any one time. According to an alternative embodiment, multiple control devices controlling a singe zone may be activated at one time. In another embodiment, the one or more control devices may control the supply water to a plurality of zones (e.g., when there is sufficient water pressure and/or volume).

The irrigation devices 140 may provide water to discrete areas defined by the zones 1-N. The irrigation devices 140 may include sprinkler heads, soaker hoses, drip lines, other water dispensing devices, and/or combinations thereof. Each zone may include at least one irrigation device 140 and the number of irrigation devices 140 provided in each zone may be determined based on the size of the zone, terrain of the zone, type of soil in the zone, types of vegetation in the zone, and/or other characteristics of the zone. As discussed in more detail below, one or more of the irrigation devices 140 may each be associated with a sensor.

The sensors 142 may monitor conditions in the zones 1-N and provide data to the interrupt controller 120 with information representing the results of the monitoring. Based on the received sensor data representing the results of the monitoring, the interrupt controller 120 may interrupt or modify the operation of the irrigation system 100 (e.g., by interrupting or modifying the control signals sent to the control devices 132.1-N). The sensors 142, 144, and/or 146 may include flow sensors, pressure sensors, solar gain sensors, moisture sensors, humidity sensors, temperature sensors, wind sensors, rain gauge sensors, barometer sensors, and other sensors monitoring the characteristics and/or the surrounding area of the irrigation system. In one embodiment, the sensors 142, 144, and/or 146 may include detecting the current weather conditions and/or obtaining predicted weather conditions (e.g., from a local weather service). The data from these sensors may be used by the interrupt controller 120 to modify operation of the irrigation system or as a standalone system to control the irrigation system.

According to one embodiment, the sensors 142 may monitor the operating conditions of the irrigation devices 140 and/or the branch supply lines 136 within the zones 1-N. One or more of the sensors 142 may also monitor the characteristics of the zone (e.g., soil condition, amount of water delivered to the zone, wind direction and/or speed, moisture level, and/or rain gauge). The sensors 142 may be wireless sensors providing data 124 to the interrupt controller 120 via the network 150.

The interrupt controller 120 may receive data from the sensors 142 and determine whether an out of range condition exists in one or more of the zones. The interrupt controller 120 may analyze the received data and compare it to predefined limits to determine if the out of range condition exists. If the out of range condition exists in one or more of the zones, the interrupt controller 120 may interrupt or modify the control signals being sent to the control devices 132.1-N. The out of range condition may include one or more of excess water being provided in the zone, a leak in the system, components operating improperly, temperature exceeding a preset limit, moisture level exceeding a preset limit, wind direction and/or speed exceeding preset limit(s), and/or amount of water supplied exceeding a preset limit.

According to one embodiment, the interrupt controller 120 may receive data from the sensors 142 provided in a zone (e.g., Zone 1) that is currently receiving water as the result of the controller 110 providing a control signal to turn on the corresponding control device (e.g., control device 132.1). If the interrupt controller 120 determines that the an out of range condition exists in the Zone 1, the interrupt controller 120 may interrupt or modify the control signal being sent to the control device 132.1, to turn off the control device 132.1.

As shown in FIG. 1, the irrigation system 100 may include additional sensors 144 and/or 146 that are provided outside of the zones 1-N. The additional sensors 144 and 146 may be wireless sensors or wired sensors. Sensors 144 may provide information about components of the irrigation system 100 that is outside of the zones 1-N. For example, the sensors(s) 144 may be provided next to or inside the supply 130 to monitor the flow and/or the amount of water in the supply 130. In another example, the sensor(s) 144 may be provided next to or as part of the main supply line 134 to monitor the flow of water in the main supply line 134 and/or detect a leak in the main supply line 134. The sensor(s) 144 may also be provided next to or as part of one of the control devices 132.1-N to detect improper operation of the control devices 132.1-N.

Sensors 146 may provide information from sources that are outside of the vicinity of the irrigation system 100. For example, sensors 146 may monitor the use of water in other systems (e.g., in an adjacent irrigation system, residence or business). Such information may be useful to adjust the operation of the irrigation system 100 when the availability of water (e.g., water pressure) is limited. Thus, for example, when water used within a residence exceeds a predetermined threshold, the interrupt controller 120 may interrupt or modify the signals being sent to the control devices 132.1-N to reduce the amount of water being used by the irrigation system 100. The interrupt controller 120 may resume normal operation when the water use within the residence falls below the predetermined threshold.

The remote control device 148 may include application(s) or connect to application(s) that allows a user to monitor and/or control the operation of the irrigation system 100. The remote control device 148 may connect to the irrigation system 100 via the network 150. The remote control device 148 may be a smartphone, PDA, laptop computer, notebook computer, netbook, cellphone, tablet device, pad device, or another portable or stationary device. In one embodiment, the remote control device 148 may be a device provided in the vicinity of the controller 110 and/or the interrupt controller 120. The remote control device 148 may communicate with and/or control the controller 110 (e.g., to enter or modify the irrigation schedule) and/or the interrupt controller 120 (e.g., to monitor and or modify the operation of the interrupt controller 120).

The remote control device 148 may receive and/or send data to and from the controller 110 and/or the interrupt controller 120. The remote control device 148 may receive notifications from the interrupt controller 120 when the interrupt controller 120 determines an out of range operation of the irrigation system 100. The interrupt controller 120 may also send a notification to the remote control device 148 when the control signal(s) are modified by the interrupt controller 120. In some embodiments, the user of the remote control device 148 may be provided with a user interface to override an automatic decision made by the interrupt controller 120 to modify the control signal(s). Thus, even when the interrupt controller 120 determines that a leak is detected in the system and modifies the control signal to disable water flow to a specific zone, the user may override the decision of the interrupt controller 120 to enable water flow to the specific zone with the detected leak.

Similarly, the user of the remote control device 148 may be provided with a user interface to manually modify the control signals being provided by the controller 110 and/or the interrupt controller 120. For example, the user may turn on one or more control devices 132.1-N that are in an off state, and/or may turn off one or more control devices 132.1-N that are in an on state. Thus, the user may control the operation of the control devices 132.1-N via the network while being away from the physical location of the controller 110 and/or the interrupt controller 120.

The remote control device 148 may also be used to enter and/or modify the parameters of normal operation range(s) of each zone. The user may also select which sensors are measured and define the normal ranges of the sensor signals.

The interrupt controller 120 may also receive data from other sources (e.g., internet, weather forecaster, utility company, and/or local government) over the network 150. The interrupt controller 120 may use this additional data to determine normal operation range(s) of the irrigation system and/or to determine when the control signals provided by the controller 110 should be interrupted and/or modified. For example, the interrupt controller 120 may interrupt or modify the control signals to turn off all control devices 132.1-N when the utility company or the local government issues a water shortage or imposes mandatory restrictions on outdoor watering.

As discussed above, the interrupt controller 120 may communicate with the sensors 142, 144, and 146 and the remote control device 148 over the network 150. The network 150 may include: an internet, such as the Internet; an intranet; a local area network (LAN); a wide area network (WAN); a metropolitan area network (MAN); a body area network (MAN); and a combination of networks, such as an internet and an intranet. The network 150 may be a wireless network (e.g., radio frequency waveforms, free-space optical waveforms, acoustic waveforms, etc.) and may include portions that are hard-wired connections (e.g., coaxial cable, twisted pair, optical fiber, waveguides, etc.). The network 150 may utilize a cellular network.

According to one embodiment, the network 150 may be a wireless mesh network with the sensors 142, 144, and/or 146 being nodes of the network, thus forming a dynamic distributed network. Other devices may be included in the mesh network to provide additional nodes. The mesh network may operate in one of the FCC unlicensed bands. The mesh network used by the interrupt controller 120 to communicate with the sensors part of the irrigation system 100, may be different from a network used to communicate with other devices (e.g., sensor 146) which are outside of the irrigation system. In one embodiment, a terminal may be included in the mesh network to connect the mesh network to another network (e.g., internet).

As shown in FIG. 1, the sensors 142 and 144 may be spread out over the various zones 1-N part of the irrigation system 100. Transceivers of the sensors 142 and 144, the interrupt controller 120, and the various other sensors 146 may allow for an ad hoc network of sensor with known locations of each transceiver in two-dimensional space. Installation of specific sensors in the network may allow for software to provide real time conditions of the irrigation system and store the conditions for future use. For example, installing wireless moisture sensors in each zone may allow for the software to build a map of the entire network and show the operator and/or the owner of the irrigation system the amount of moisture per zone. Similar maps may be provided for other sensors (e.g., temperature sensors, solar gain sensors, and pressure sensors). The real time conditions and the map(s) may be provided to the user via the remote control device(s) 148.

As discussed above, the interrupt controller 120 may interrupt or modify the control signals being provided by the controller 110 to the control devices 132.1-N based on information received from sensors 142, 144, or 146. The interrupt controller 120 allows for an existing irrigation system including the main controller 110 and the control devices 132.1-N to be provided with ability to respond to changing conditions detected in the irrigation system. Thus, an existing irrigation system may be upgraded by installing an interrupt controller 120 and, if needed, sensors in the vicinity of the irrigation system.

Wireless transmission of data between the sensors 142, 146 and the interrupt controller 120 may allow for many types of sensors to be incorporated into the system and may reduce installation costs associated with traditional wired sensors. In one embodiment, the wireless transmission signals 124 may be encrypted for added security. In one embodiment, the wireless transmission signals 124 using the network 150 may utilize an ad hoc mesh network to increase wireless transmission range and/or improve reliability.

As shown in FIG. 1, the interrupt controller 120 may receive signals from a plurality of controllers 110 and 114. In one embodiment, the interrupt controller 120 may intercept only a limited number of control signals from the controller 110, while other control signals from the controller 110 may be provided directly to the control devices 132.1-N. Thus, one or more of the control lines 112 may be directly coupled to the control devices 132.1-N. A direct connection may be provided from the controller 110 to control devices 132.1-N that do not need to be monitored by the interrupt controller 120 or to control devices 132.1-N which do not have sensors installed in zones associated with the respective control devices 132.1-N.

While in FIG. 1 the interrupt controller 120 is shown as a separate device from the controller 110, in some embodiments, the interrupt controller 120 may be provided as part of the controller 110 or, as discussed further below, the interrupt controller 120 may be used to perform one or more operations of the controller 110.

Figure 2:
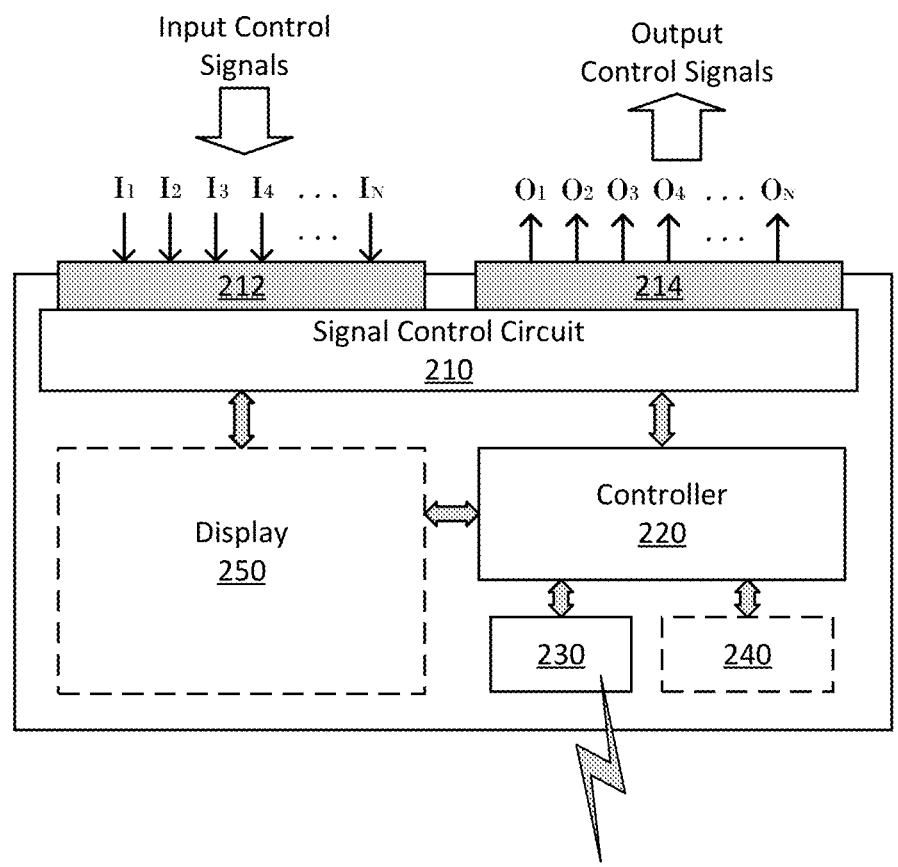
FIG. 2 illustrates an interrupt controller according to an embodiment of the present disclosure.

FIG. 2 illustrates an interrupt controller 200 according to an embodiment of the present disclosure. The interrupt controller 200 may correspond to the interrupt controller 120 shown in FIG. 1. The interrupt controller 200 may include a signal control circuit 210, a plurality of input terminals 212, a plurality of output terminals 214, a controller 220, a network interface 230, input device 240, and display 250. The components of the interrupt controller 200 may be provided in an enclosure, which may be watertight (e.g., a Nema4 or equivalent enclosure).

The signal control circuit 210 may receive one or more control signals $I_{1-N}$ via the plurality of input terminals 212 and may output one or more control signals $O_{1-N}$ via the plurality of output terminals 214. According to one embodiment, the signal control circuit 210 may receive control signals $I_{1-N}$ from an irrigation controller (e.g., controller 110 shown in FIG. 1) via the plurality of input terminals 212 and may output control signals $O_{1-N}$ to control devices (e.g., control devices 132.1-N including switchable valves shown in FIG. 1) via the plurality of output terminals 214. Each input terminal 212 may have a corresponding output terminal 214.

As shown in FIG. 2, the signal control circuit 210 may be coupled to the input terminals 212 and the output terminals 214. The signal control circuit 210 may provide the controller 210 with information regarding the received control signals $I_{1-N}$ and/or may receive instructions from the controller 210 to interrupt or modify the input control signals $I_{1-N}$ such that a modified output control signals $O_{1-N}$ is provided at one or more of the output terminals 214.

The controller 220 may be coupled to the network interface 230 receiving data from sensors disposed within or in proximity to the irrigation system. The controller 220 may also receive instructions from the input device 240. Based on the data received from the sensors and/or the instructions from the input device 240, the controller 220 may issue instructions to modify one or more of the control signals $I_{1-N}$ being received by the signal control circuit 210.

The signal control circuit 210 may include a plurality of "relay" circuits, where the term "relay" is taken to include, but is not limited to, electromechanical relays, and solid state relay components or circuits. The relay circuits may receive the input control signals $I_{1-N}$ and provide output control signals $O_{1-N}$ based on the instructions received from the controller 220. In one embodiment, one input terminal and corresponding output terminal may be coupled to a single relay. When the controller 220 does not provide instructions to interrupt or modify the received control signals, the relays may couple each input terminal to the corresponding output terminal to providing the received control signals at the output terminal (e.g., without modification). By default, the relays may couple each input terminal to the corresponding output terminal. When the controller 220 sends instructions to interrupt or modify one or more of the received control signals (e.g., turn off a switchable valve), the relay(s) may be opened to break the connections between one or more input terminals 212 and the one or more corresponding output terminals 214. According to one embodiment, relays in the signal control circuit 210 may be low voltage (3-24 volt) latching relays.

The signal control circuit 210 may include a second set of relays (e.g., in parallel to the relays discussed above) to couple one or more of the output terminals 214 to a control signal provided by the interrupt controller 200. For example, the interrupt controller 200 may receive a control signal (e.g., 24 VAC) from an external power source and this control signal may be coupled to one or more of the output terminals 214 via the second set of relays to activate the switchable valves coupled to the output terminals 214. Thus, even when the received control signals via the input terminals 212 do not provide a control signal to activate the switchable valves, the interrupt controller 200 may still activate a switchable valve by coupling the control signal from the external power source to the one or more of the output terminals 214 via the second set of relays.

The signal control circuit 210 may include a detecting circuit to detect when a control signal to activate a switchable valve is provided to the input terminals 212. According to one embodiment, the signal control circuit 210 may include active voltage detectors and optoisolators to intercept the control signals from the main controller to the switchable valves. A signal indicating that a control signal has been received at one of the input terminals 212 may be sent to the controller 220 such that the controller 220 may make a determination of whether the control signal should be provided at the corresponding output terminal. The detecting circuit may also send indications of receiving a control signal to LEDs associated with the input terminals 212 or to the display 250 to provide a visual indication of a control signal being received at the input terminals 212 and of which switchable valves or zones are being activated.

In one embodiment, the signal control circuit 210 may include a decoder to decode the control signal when an encoded digital signal is received at the one or more input terminals 212 (e.g., with a two wire system). The encoded digital signal may indicate an assigned address of the control device in the irrigation system to be activated or deactivated. The digital signal may be decoded to determine which switchable valve and/or zone is being activated. Based on this determination the controller 220 may make a determination of whether the switchable valves and/or zones should be activated and based on this determination determine whether the digital control signal needs to be modified or whether it can be sent to the output terminals without modification. An encoder may be included in the signal control circuit 210 or the controller 220 to encode a modified control signal.

The controller 220 may include one or more processors to perform the operation of the controller 220. The controller 220 may be a microcontroller (e.g., Texas Instruments CC430XX or equivalent microcontroller with built in transceivers, but is not so limited). The microcontroller may include on board voltage regulators, filters and shielding. The controller 220 may include a program to perform the operations disused in this application. The controller 220 may include memory to store the program and preset parameters used by the program. The default parameters may include preset parameters for different types of sensors or modes of operation, parameters set during a calibration process, and/or parameters defined during a learning mode.

The network interface 230 may allow for communication with sensors and/or other devices part of the irrigation system and/or devices outside of the irrigation system. The network interface 210 may include terminals to connect the network via a wired connection and/or may include a wireless transmitter and/or receiver. The network interface 230 may allow for bidirectional communication between the controller 220 and the sensors over the network. The controller 220 may receive data from the sensors via the network interface 210 representing the conditions of the irrigation system. The controller 220 may also send data to the sensors to request data from the sensors and/or to send data to the sensors to change the settings in the sensor or to perform an operation on a device associated with the sensor. In one embodiment, the network interface 210 may be a wireless adapter (e.g., an air card) including a transmission antenna. The network interface 210 may connect to a mesh network and may be a node in the mesh network. According to one embodiment, the network interface 230 may be an AirPrime™ embedded module coupled to the controller 220 providing cellular access to the internet. The network interface 230 may include one or more antennas (e.g., an ISM band mesh network antenna). According to another embodiment, the network interface 230 may be a wireless LAN interface module coupled to the controller 220 providing wireless access to the internet through a local area network.

The input device 240 may include one or more button to allow a user to control the settings of the interrupt controller 200. The input device 240 may include one or more of a keypad, a keyboard, a button panel area, and/or navigation button(s). The input device 240 may be used to set which data from the sensors will be used by the controller 220, set a schedule for when the controller will receive data from the sensors, change the acceptable limits for the sensors, and/or set how the data will be used by the controller 220.

According to one embodiment, the input device 240 may include a button to activate and/or deactivate a learning mode during which the acceptable levels of the sensors may be set. During the learning mode, the irrigation system may cycle through the schedule and the controller 220 may receive data from the sensors defining the acceptable values of the sensors. The acceptable values of the sensors may be stored in memory associated with the controller 220. In one embodiment, when one zone of the irrigation system is activated only the values of the sensors associated with the activated zone may be stored and associated with the activated zone. In another embodiment, when one zone of the irrigation system is activated the values of sensors from all of the zones may be stored and associated with the activated zone. After the learning mode and during operation, the controller 220 may compare the received data from the sensors to the stored acceptable values.

The display 250 may display the operating conditions of the interrupt controller 200. For example, the display 250 may indicate which zones of the irrigation system are being activated at a particular time. The operating conditions of the interrupt controller 200 displayed on the display 250 may include for which zone the control signals are being modified, and operating history (e.g., in which zones the problems are detected and/or which control signals have been modified in the last cycle or during a predefined time period). The display 250 may include an LCD display, which may be a touch panel LCD. The control settings of the interrupt controller 200 may be set via the touch panel LCD. The input device 240 may be part of the display 250.

Figure 3:
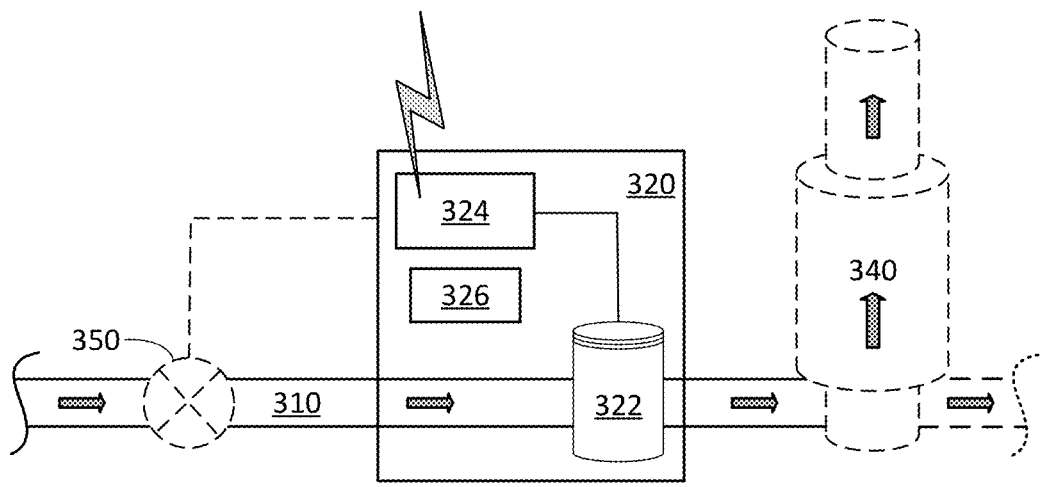
FIG. 3 illustrates a system including a sensor according to an embodiment of the present disclosure.

FIG. 3 illustrates a system 300 including a sensor 320 according to an embodiment of the present disclosure. The sensor 320 may include a sensing component 322 and a sensing controller 324. The sensing component 322 may be coupled to the sensing controller 324 and may be provided in an enclosure, which may be watertight (e.g., a Nema4 or equivalent enclosure).

As shown in FIG. 3, the sensor may be positioned within a portion of a fluid supply line 310. The fluid supply line 310 may be coupled to an irrigation device 340 (e.g., a sprinkler head). In other embodiments, the sensor 320 may be provided next to the fluid supply line 310 and/or the irrigation device 340. In one embodiment, the sensor 320 may be positioned within a portion of the irrigation device 340.

The sensor 320 may monitor the conditions in the irrigation system 300 and/or the area surrounding the irrigation system 300. Data representing the conditions may be collected by the sensor 320 and sent to another device in the system (e.g., the interrupt controller). The data collected by the sensor 320 may be analyzed (e.g., by the sensing controller 324 and/or the interrupt controller) to determine whether the irrigation system 300 is operating within acceptable levels. While in FIG. 3 the sensor 320 is illustrated as a flow sensor with the sensing component 322 monitoring the flow within the fluid supply line 310, the sensor 320 may be a pressure sensor, a solar gain sensor, a moisture sensor, a humidity sensor, a temperature sensor, a wind sensor, a rain gauge sensor, a barometer sensor, or another sensor monitoring the characteristics and/or the surrounding area of the irrigation system 300.

The sensing component 322 may include one or more circuit components to detect changing conditions in the irrigation system 300. The sensing component 322 may generate signals representing the condition in the irrigation system (e.g., signal representing rate of flow in the fluid supply line 310) and provide the signals to the sensing controller 324. The sensing component 322 may include passive circuit components and/or may not require external power to operate. In one embodiment, the sensing component 322 may receive power from a power source part of the sensor 320.

The sensing controller 324 may receive signals from the sensing component 322 and convert the signals to a format that can be sent to the interrupt controller. For example, the sensing controller 324 may receive an analog signal and convert the analog signal into a digital signal to be transmitted to the interrupt controller. The sensing controller 324 may include an encoder to encode the analog and/or digital signal. The sensing controller 324 may include network interface to transmit data to the interrupt controller and/or other devices part of the network. The network interface may allow for wireless communication with the interrupt controller and other components part of the network. The network interface may include an antennal (e.g., an ISM band antenna).

The sensing controller 324 may receive data from other devices part of the network. For example, the sensing controller 324 may receive data from other sensors. The received data may be retransmitted to other devices part of the network. The sensing controller 324 may receive data from the interrupt controller. The data received from the interrupt controller may include a request for data, instructions to start or end collecting data by the sensing component 322, preset limits for acceptable operating conditions, sensor parameters (sensitivity of the sensor, how often to send data, and/or how often to collect data). In one embodiment, the sensing controller 324 may monitor the signals received from the sensing component 322 and send a notification to the interrupt controller when the signals exceed preset values (e.g., an upper limit and/or a lower limit). In another embodiment, the sensing controller 324 may send data to the interrupt controller to be analyzed by the interrupt controller. The sensing controller 324 may include a microcontroller to perform the operations (e.g., Texas Instruments®

CC430XX) and may include a built in transceiver on PCD designed board. The sensing controller 324 may include an on board voltage regulator, filter and shielding. The sensing controller 324 may include memory to store program instructions and to store sensor data and/or preset limits.

The sensor 320 may include a power source 326 to provide power to the sensing component 322 and/or the sensing controller 324. The power source 326 may be a battery that is part of the sensor 320. In another embodiment, the power source 326 may be an external power source and/or a solar power source. The sensor 320 may transmit a signal indicating low power to the interrupt controller when the power source 326 (e.g., battery) reaches a predetermined level or when available power is limited (e.g., solar power source is generating power below a predetermined level).

In one embodiment, the sensing component 322 may detect the changes in the flow rate within the supply line 310 and/or the irrigation device 340. The sensing component 322 may include a paddle wheel device (e.g., with a plurality of blades arranged in a symmetrical pattern) to be driven by the fluid moving in the supply line 310. The paddle wheel device may be arranged such that the paddles are perpendicular to the fluid flow inside the supply line 30. A magnet may be disposed at the tip of one or more paddles that rotates with the paddles and induces a voltage in a coil disposed near the paddle wheel device. The voltage induced in the coil may be an analog signal (e.g., a sine wave or other waveform or wavelet). A circuit in the sensing comment 322 or the sensing controller 324 may convert the analog signal into pulses of digital information. In one embodiment, a magnetorestrictive sensor (e.g., a giant magnetorestrictive sensor) may receive the induced voltage and convert it to a distinct pulse of digital information. The rate of the pulses may be converted to a flow measurement. In one embodiment, an analog to digital converter in the sensor 320 may receive the analog signal from the sensing component 322 and provide a digital signal representing the analog signal. The sensing controller 324 may send the pulses received from the sensing component 322, the flow measurement, and/or the digital signal to other components in the irrigation system (e.g., interrupt controller).

While the sensing component 322 is discussed above with reference to a paddle wheel device the sensing component 322 may include differential pressure sensors, orifice meter, venture meter, flow nozzle, pitot tubes, rotameter, turbine meter, corioliz mass flow meter, vortex shedding flow meter, or ultrasonic flow meter, doppler meter, magnetic flow meter, calorimetric flow meter, but is not so limited.

According to one embodiment, the system 300 may include a flow control valve 350. One embodiment may have the control valve 350 function as a flow interruption valve, such as a latching normally open valve. Another embodiment may have the control valve 350 function as to permit flow, such as a normally closed valve. The flow control valve 350 may be provided in the main supply line and/or in the branch supply lines. The flow control valve 350 may control the flow in response to a signal. The signal to activate the flow control valve 350 may be received from the sensor 320 (e.g., sensing controller 324) or from the interrupt controller (e.g., via the sensing controller 324). The signal to activate the flow control valve 350 may be sent when an abnormal condition is detected in the irrigation system or the surrounding environment. The sensor 320 may be configured to send a signal to activate the flow control valve 350 when the values measured by the sensing component 322 exceed preset limits, which may be similar to the preset limits used to determine normal operation of the irrigation system or may be different preset limits indicating an emergency and need to shut down the system immediately.

Figure 4:
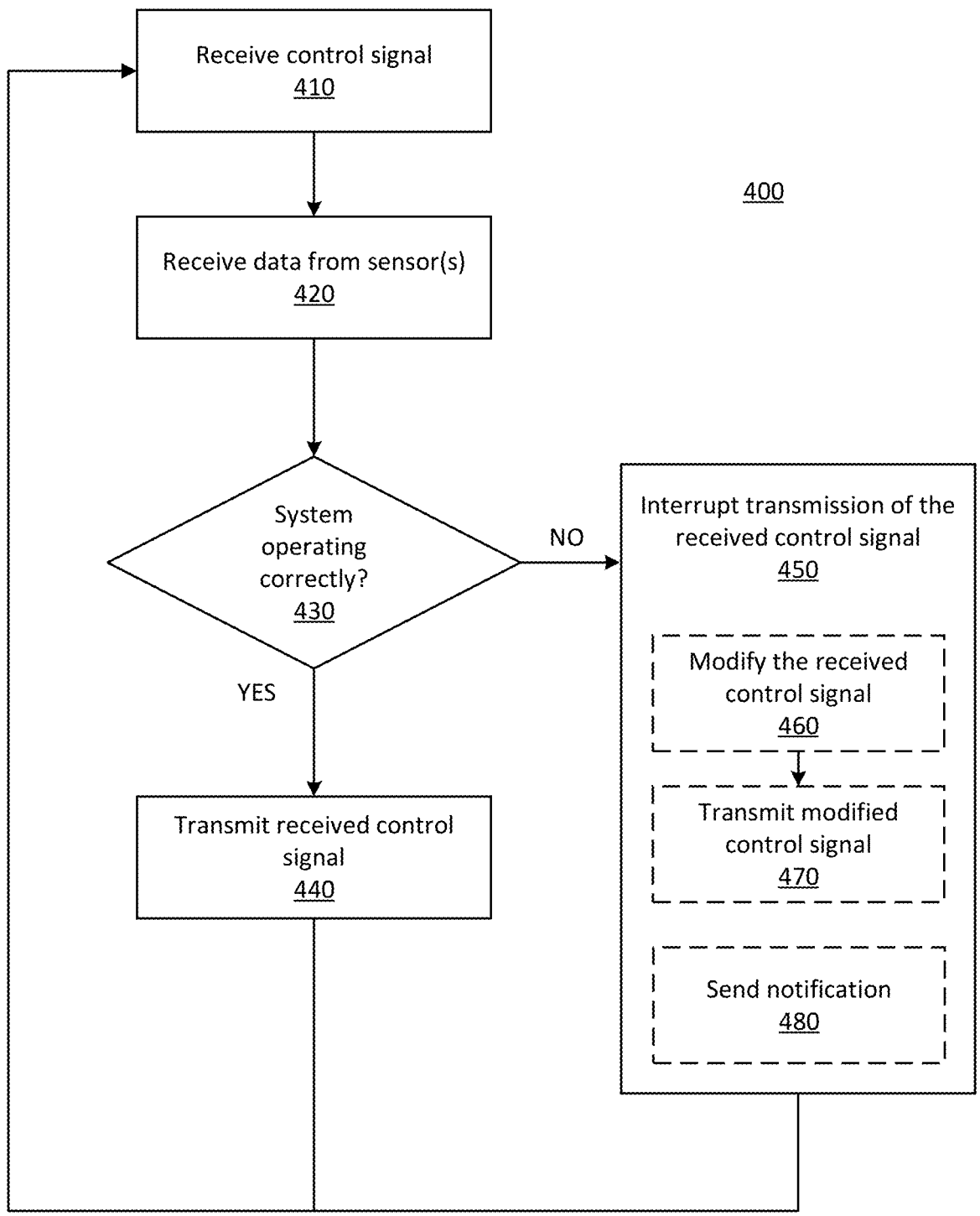
FIG. 4 illustrates a method for controlling flow in an irrigation system according to an embodiment of the present disclosure.

FIG. 4 illustrates a method 400 for controlling flow in an irrigation system according to an embodiment of the present disclosure. The method 400 may be performed by a controller including one or more processors (e.g., interrupt controller 200 shown in FIG. 2). The method 400 may include receiving control signal(s) 410, receiving sensor data from one or more sensors 420, based on the sensor data determining whether the system is operating correctly 430, if the system is operating correctly transmitting the received control signal 440, if the system is not operating correctly, interrupting transmission of the received control signal 450.

Receiving the control signal(s) 410 may include receiving one or more control signals from a controller (e.g., a controller 110 shown in FIG. 1) programmed to sequentially control the flow of water in a plurality of zones of the irrigation system. The control signals may indicate which of the plurality of zones is to be activated. In one embodiment, the control signals may be 24 VAC control signals. In another embodiment, the control signals may be digital data indicating the address of the device (e.g., control valve) in the system to be activated. In this embodiment, the digital control signal may be decoded to determine the instructions in the digital control signal.

Receiving sensor data from the sensor(s) 420 may include receiving data from one or more sensors disposed as part of the irrigation system or in the vicinity of the irrigation system. The sensor data may indicate the conditions in one or more zones of the irrigation system. The sensor data may be received in response to a request signal. The request may be sent after a control signal is received by the controller. In one embodiment, the request may be sent to the zone(s) which are to be activated by the received control signal(s). In response to the request, the data from the sensors part of the zone(s) to be activated may be received and analyzed. In another embodiment, the sensor data may be received periodically from the sensors at predetermined intervals. In another embodiment, the sensor data may be received when a condition outside preset limits is detected by the sensor(s). The sensor data may also include data received from other sources (e.g., weather monitoring stations, government entities, and instructions from a user).

Determining whether the system is operating correctly 430 may include analyzing the sensor data to determine whether the conditions in the irrigation system are outside of preset limits. The sensor data may be compared to preset acceptable values to determine if the irrigation system is operating outside of the preset values. The determination may include determination whether the values of the sensors stay outside of the acceptable values for a predetermined period of time (e.g., 5 seconds). For example, the determination may include determining that data from a flow sensor indicates that flow is below a preset lower limit or the data from the flow sensor indicates that flow is above a preset upper limit for at least the predetermined period of time. Thus, brief fluctuations in the sensor data, for example due to noise, may be ignored by the controller.

The determination may be made before and/or after the control signal is sent to the irrigation system (e.g., step 440). Thus, the determination may indicate whether the irrigation system is operating correctly before water is provided to a specific zone of the irrigation system. The determination may also indicate whether the irrigation system is operating correctly after water is provided to a specific zone of the irrigation system. The determination may be compared to a different set of preset values depending on whether the control signal is already sent or not sent to the irrigation system to activate the specified zone.

Based on the determination (step 430), the system may transmit the received control signal 440 to the irrigation system or may interrupt the transmission of the received control signal 450. When the system is determined to be operating correctly, the received control signal(s) may be transmitted to the irrigation system. Transmitting the received control signal 440 may include activating a relay to provide a path of the control signal to travel. By default the relay may be activated to provide a path and may be deactivated when the system is determined to be not operating correctly.

When the system is determined to not be operating correctly, the transmission of the received control signal may be interrupted 450. The interruption may include not transmitting the received control signal or stopping the transmission of the control signal that is already sent to the irrigation system. Interrupting the transmission of the control signal may include opening a relay to break a path transmitting the control signal to the irrigation system. In one embodiment, the interruption of the control signal may be made only to the zone from which the sensor data indicates a problem. Thus, the watering of other zones may continue (e.g., based on the schedule programmed in the main irrigation controller) if the sensor data associated with the other zones indicates that the system is operating correctly.

Interrupting the transmission of the control signal may include modifying the control signal 460 and transmitting the modified control signal 470. For example, when the received control signal is a 24 VAC control signal activating a specific zone, the modified control signal may be a 0 VAC control signal. When digital control signals are received, the digital signal may be modified to turn off a component specified to be turned on in the digital control signal and the modified digital signal may be transmitted.

When the irrigation system is determined to not be operating correctly, a notification may be provided to indicate such a determination 480. The notification may include displaying on a display part of the controller that a problem is detected. In another embodiment, an audio notification may be provided or a notification may be sent to a portable device, such as a smartphone, over a network and/or the internet. The notification may be sent via an email or a text message to the portable device. In one embodiment, the user may send a response to the controller to instruct the controller to ignore the determination that the system is operation out of the acceptable limits and to continue providing the received control signal to the irrigation system. The notification may include details about the detected abnormality. For example, the notification may include an indication of the zone in which the abnormality is detected, the time when the abnormality was detected, the values measured by the sensors (e.g., the sensor detecting the abnormality and/or the sensors not detecting the abnormality), the preset values, and/or an indication of which sensor(s) detected the abnormality.

Figure 5:
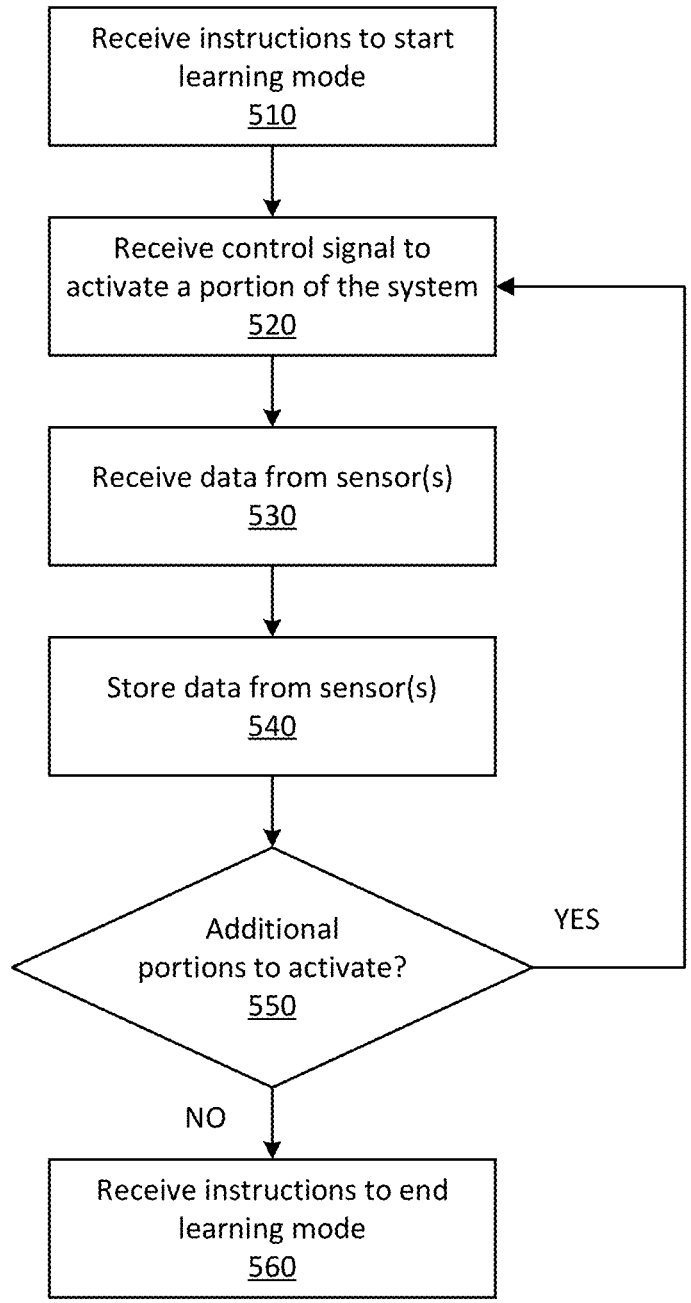
FIG. 5 illustrates a method to perform a learning operation according to an embodiment of the present disclosure.

FIG. 5 illustrates a method 500 to perform a learning operation according to an embodiment of the present disclosure. The method 500 may be performed by the interrupt controller to receive and store data from sensors representing normal operating conditions of the irrigation system. The stored data may be used during operation of the irrigation system to determine if the irrigation system is operating correctly. The method 500 may include receiving instructions to start a learning mode 510, receiving control signal to activate a portion of the irrigation system 520, receiving data from sensor(s) 530, storing data from the sensor(s) 540, determining if additional portions of the irrigation system are to be activated 550, and receiving instructions to end the learning mode 560.

The instructions to start a learning mode 510 may be received in response to a user activating the learning mode on the controller (e.g., the interrupt controller). The learning mode may be activated before the interrupt controller receives control signals and/or data from sensors.

After the learning mode is activated, the method 500 may include receiving control signal(s) to activate a portion of the system 520 from an irrigation controller (e.g., the controller 110). The received control signal(s) may be provided to the irrigation system by the main irrigation controller to activate the portion of the irrigation system. In another embodiment, the control signals may be generated by the interrupt controller to activate a portion of the irrigation system.

After a portion of the irrigation system is activated, data may be received from the sensor(s) 530. The received sensor data may be stored 540 in memory associated with the interrupt controller. The sensor data received from the sensors 530 may be data from sensors belonging to the portion of the irrigation system being activated. In another embodiment, data from all of the sensors part of the irrigation system may be received and stored. The sensor data may be associated with the portion of the irrigation system that is activated at the time the data is received. For example, when zone 1 is activated, the sensor data may be received from the sensors in zone 1 and may be stored and associated with preset sensor limits for zone 1.

Storing the data from the sensors may include setting acceptable limits for the stored data. Thus, during operation, small variations in the sensor data may still be determined as being within acceptable limits. For example, when sensor data with a value representing normal flow of water in a specific zone is received, upper and/or lower limits of acceptable values for the sensor may be set. In one embodiment, a predetermined range of acceptable values may be centered at the value representing normal flow of water. In another embodiment, a plurality of values may be extracted from the sensor data while the specific zone is activated and the plurality of values may be used to set the upper and/or lower limits. The plurality of values may be averaged and a predetermined range may be set at the averaged value to provide the upper and lower limits of acceptable values for the sensor. The predetermined range may be selected based on a type of the sensor. In one embodiment, setting acceptable values and/or limits for the preset values may include dynamically setting the preset values based on the data received from the plurality of sensors. For example, the preset values may be set dynamically during the learning mode. In another example, data from sensor(s) and/or other devices (e.g., a weather station or a weather sensor) may be continuously or periodically received to dynamically update the preset values.

Once sensor data is stored for an activated portion of the irrigations system, a determination may be made as to whether additional portions of the irrigation system need to be activated 550. If addition portions need to be activated, then steps 520, 530, and 540 may be repeated for each additional portion to be activated. If no additional portions need to be activated, then instructions may be received to end the leaning mode 560.

The method 500 may include receiving and storing sensor data when no portions of the irrigation system are activated. Thus, acceptable values of sensors may be stored to indicate normal operation of the irrigation system when no portion of the irrigation system is activated. This data may be used by the interrupt controller to monitor the irrigation system even while the irrigation system is not operation and to provide a notification when an abnormal condition is detected in the irrigation system.

The explanations of the exemplary embodiments are made with reference to an interrupt controller that is receiving signals from a main irrigation controller and interrupting the control signals based on data received from sensors. The interrupt controller may also be substituted for the main irrigation controller by disconnecting the flow interrupt controller from the main irrigation controller and powering each interrupt relay at the appropriate time with the embedded software. In this embodiment, the interrupt controller may include a power supply providing power to the relays in the signal control circuit 210 and the controller 220 may be programmed to control the relays to sequentially active the zones part of the irrigation system at predetermined times.

In addition to monitoring whether the irrigation system is operating properly, the interrupt controller may become "smart" by the addition of wired or wireless sensors which connects to the microprocessors in the interrupt controller. Sensors such as moisture sensors, which measure moisture in the ground; solar radiation level sensors, which can measure the amount of sun light and by watching power produced, deduced the cloud cover; temperature sensors; wind speed and direction sensors can determine evaporation rate; humidity sensor; and tilting bucket rain gauge may provide data to the microprocessor to help determine the length of time that each zone should be watered. Data from the sensors, which may be wirelessly linked to the interrupt controller, may be used even when signals from the main irrigation controller are received by the interrupt controller. With the additional sensor data, the user may enable the main irrigation controller to provide the optimum amount of water to each zone, given the soil condition and the different plants types to be watered.

In addition, installing the interrupt controller which receives inputs and stores data from not only a variety of remote sensors—temperature, rain, humidity, solar gain, cloud cover, wind speed and direction—but also historical weather data, and streaming data from a variety of weather inputs, the optimum amount of water can be provide, by simply shutting down the flow early from the main irrigation controller. In one embodiment, if the interrupt controller determines that due to some other factor the plants are not receiving the appropriate amount of water, the interrupt controller may alert the irrigation contractor and/or the owner to increase the time for the appropriate zone on the main irrigation controller. In another embodiment, the interrupt controller could be used for at least a portion of the time as the main controller providing control signals to activate specific zone using the various sensor data sources, even when control signals are not received from the main irrigation controller.

The explanations of the exemplary embodiments are made with reference to an interrupt controller that is controlling signals provided to an irrigation system. However, the interrupt controller may also be used to monitor and control the flow of water are not limited to an irrigation system and may used in other systems. For example, the interrupt controller may monitor the flow of water in a green house, water park, industrial or residential plumbing systems, and other water delivery systems. In one example, a flow interruption valve and/or a flow sensor transceiver may be provided in a supply line coupled to an appliance in a residence (e.g., water heater or a boiler system). The flow sensor may detect abnormal flow created due to a rupture or a leak in the system, and a signal may be sent to the flow interruption valve (located at the main supply line or near the appliance) to interrupt the flow of water.

Some embodiments of the exemplary embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client.

The above-illustrated software components may be tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using C, Java, C++, or other object-oriented programming language and development tools. Another embodiment of the invention may be implemented in hard-wired circuitry in place of, or in combination with machine readable software instructions.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

We claim:

1. An interrupt control apparatus comprising:
a plurality of input terminals, each input terminal configured to receive a respective control signal from an irrigation controller configured to generate a plurality of control signals for controlling a plurality of irrigation devices, disposed in a plurality of zones and configured to provide fluid to the plurality of zones, according to an irrigation schedule;
a plurality of output terminals, each output terminal configured to transmit one of the received control signals to at least one irrigation device of the plurality of irrigation devices;
a plurality of switching elements coupling the input terminals to respective output terminals, each respective input terminal is coupled to the respective switching element, each respective output terminal is coupled to the respective switching element, and each switching element of the plurality of switching elements receives a respective control signal from the irrigation controller;
a processing system, including at least one processor, the processing system being at least configured to:
wirelessly receive data from a flow sensor coupled to a master irrigation system valve through which fluid is provided to an irrigation system, wherein the flow sensor is configured to measure flow of fluid into the irrigation system during execution of the irrigation schedule;
based on the received data from the flow sensor, determine whether the fluid flow in one or more zones of the plurality of zones exceeds a preset value; and
when the determination is made that the fluid flow in one or more zones of the plurality of zones exceeds the preset value during execution of the irrigation schedule, control one or more of the switching elements receiving at least one of the plurality of control signals from the irrigation controller according to the irrigation schedule to interrupt the transmission of the at least one of the plurality of control signals to the one or more irrigation devices of the plurality of irrigation devices.

2. The interrupt control apparatus according to claim 1, wherein each control signal received from the irrigation controller controls the irrigation device(s) in a different zone of the plurality of zones.

3. The interrupt control apparatus according to claim 2, wherein the plurality of control signals received from the irrigation controller control the plurality of irrigation devices according to the irrigation schedule such that one or more irrigation devices from a single zone of the plurality of zones are activated to provide fluid to the respective zone of the plurality of zones at a time.

4. The interrupt control apparatus according to claim 1, wherein the flow sensor is a wireless sensor and the data is received from the wireless sensor over a wireless mesh network.

5. The interrupt control apparatus according to claim 1, wherein:
the processing system is configured to wirelessly receive data from a plurality of additional sensors disposed in the plurality of zones and configured to measure flow of fluid in the plurality of zones, the received data representing fluid flow in the plurality of zones, and the fluid flow represented by the data received from a first sensor of the plurality of sensors includes fluid flow inside of a fluid supply line coupled to a first irrigation device of the plurality of irrigation devices associated with the first sensor and provided in a first zone of the plurality of zones; and
when the fluid flow inside of the fluid supply line exceeds a preset value for the first zone, controlling a switching element, coupled to an output terminal configured to transmit the received control signals to the first irrigation device, to interrupt transmitting the received control signal to the first zone such that the first irrigation device in the first zone is deactivated to stop supply of fluid to the first zone.

6. The interrupt control apparatus according to claim 1, further comprising a touch panel display configured to:
display a notification when the values represented by the received data from the flow sensor do not match the preset values; and
receive user inputs setting the preset values.

7. The interrupt control apparatus according to claim 1, wherein the processing system is further configured to:
when the fluid flow represented by the received data from the flow sensor does not match the preset value, (1) transmit, to a remote control device, a notification indicating that the processing system has detected an abnormality, and (2) receive instructions, from the remote control device, to control one or more of the switching elements to interrupt transmitting one or more of the control signals controlling the plurality of irrigation devices.

8. The interrupt control apparatus according to claim 1, wherein the processing system is further configured to:
while transmitting the plurality of received control signals to the irrigation devices, receiving an input to enter a learning mode during which data from the flow sensor is received and stored in memory associated with the processing system; and
setting the preset value for one or more zones of the plurality of zones based on values represented by the data received from the flow sensor during the learning mode.

9. The interrupt control apparatus according to claim 8, wherein the learning mode is activated for a time period during which data from the flow sensor is captured to provide a range of values for setting the preset value for one or more zones of the plurality of zones or during which the preset value for one or more zones of the plurality of zones is set dynamically based on the values represented by the data received from the flow sensor.

10. An interrupt controller comprising:
a plurality of input terminals, each input terminal configured to receive a respective control signal provided by an irrigation controller controlling supply of water to a plurality of irrigation zones by activating and deactivating, according to an irrigation schedule, a plurality irrigation devices disposed in the plurality of irrigation zones;
a plurality of output terminals, each output terminal configured to couple to at least one irrigation device of the plurality of irrigation devices;
a signal control circuit including a plurality of relays for coupling the input terminals to respective output terminals, wherein each respective input terminal of the plurality of input terminals is directly coupled to a respective relay which is directly coupled to a respective output terminal, and each relay of the plurality of relays receives a respective control signal from the irrigation controller via the coupled input terminal;

a network interface configured to wirelessly receive data from a flow sensor coupled to a master irrigation system valve through which water is provided to an irrigation system, wherein the flow sensor is configured to measure flow of water into the irrigation system during execution of the irrigation schedule; and a control system coupled to the signal control circuit and the network interface, the control system configured to:

based on the received data from the flow sensor, determine whether the water flow in one or more zones of the plurality of zones exceeds a preset range; and when the water flow in one or more irrigation zones of the plurality of irrigation zones is determined to exceed the preset range, control one or more relays of the plurality of relays in the signal control circuit receiving at least one of the plurality of control signals from the irrigation controller according to the irrigation schedule to decouple one or more input terminals from the respective one or more output terminals to interrupt the supply of water to one or more irrigation zones by the irrigation devices disposed in the one or more irrigation zones in which the water flow is determined to exceed the preset range.

11. The interrupt controller according to claim 10, wherein each respective input terminal provides a control signal to control irrigation devices in a single irrigation zone, and the plurality of control signals received from the irrigation controller control the plurality of irrigation devices according to the irrigation schedule such that one or more irrigation devices from the single irrigation zone are activated to provide water to the single zone at a given time.

12. The interrupt controller according to claim 10, wherein the network interface is configured to receive data from a plurality of wireless flow sensors over a wireless mesh network including the plurality of wireless sensors, wherein the plurality of wireless flow sensors are disposed in the plurality of zones.

13. The interrupt controller according to claim 10, further comprising a display configured to display a notification when water flow represented by the data received from the flow sensor exceed the preset range.

14. The interrupt controller according to claim 10, further comprising an input panel configured to receive user inputs setting, for each zone of the plurality of irrigation zones, the preset range with a lower limit value and an upper limit value for each zone.

15. The interrupt controller according to claim 10, further comprising an input for activating a learning mode for a time period during which data from the flow sensor is received for setting the preset range for one or more zones of the plurality of irrigation zones.

16. A non-transitory computer-readable storage medium having stored therein a program executed by at least one processor of an interrupt control apparatus comprising: a plurality of input terminals, each input terminal configured to receive a respective control signal from an irrigation controller configured to generate a plurality of control signals for controlling a plurality of irrigation devices, disposed in a plurality of zones and configured to provide fluid to the plurality of zones, according to an irrigation schedule; a plurality of output terminals, each output terminal configured to transmit one of the received control signals to at least one irrigation device of the plurality of irrigation devices; and a plurality of switching elements coupling the input terminals to respective output terminals, each respective input terminal is coupled to the respective switching element, each respective output terminal is coupled to the respective switching element, and each switching element of the plurality of switching elements receives a respective control signal from the irrigation controller, the program, when executed, causing the processor to:

wirelessly receive data from a flow sensor coupled to a master irrigation system valve through which fluid is provided to an irrigation system, wherein the flow sensor is configured to measure flow of fluid into the irrigation system during execution of the irrigation schedule;

based on the received data from the flow sensor, determine whether the fluid flow in one or more zones of the plurality of zones exceeds a preset value; and when the determination is made that the fluid flow in one or more zones of the plurality of zones exceeds the preset value during execution of the irrigation schedule, control one or more of the switching elements receiving at least one of the plurality of control signals from the irrigation controller according to the irrigation schedule to interrupt the transmission of the at least one of the plurality of control signals to the one or more irrigation devices of the plurality of irrigation devices.

17. The non-transitory computer-readable storage medium according to claim 16, wherein each control signal received from the irrigation controller controls the irrigation device(s) in a different irrigation zone of the plurality of zones and the plurality of control signals received from the irrigation controller control the plurality of irrigation devices according to the irrigation schedule such that one or more irrigation devices from a single zone of the plurality of zones are activated to provide fluid to the single zone at a given time.

18. The non-transitory computer-readable storage medium according to claim 16, wherein data from a plurality of wireless flow sensors disposed in the plurality of zones is received over a wireless mesh network including the plurality of wireless flow sensors.

19. The non-transitory computer-readable storage medium according to claim 16, wherein the program, when executed, further causes the processor to:

when the fluid flow represented by the received data from the flow sensor is outside of the preset value, (1) transmit, to another device, a notification indicating that the fluid flow represented by the received data from the flow sensor is outside of the preset value, (2) after transmitting the notification and when instructions are received from the another device to cancel the interruption of the one or more control signals received from the irrigation controller, control the switching element to transmit the received control signals to the plurality of irrigation devices without interruption.

20. The non-transitory computer-readable storage medium according to claim 16, wherein the program, when executed, further causes the processor to:

receive an input to enter a learning mode during which (1) control signals are transmitted to the plurality of irrigation devices according to cycles of the irrigation schedule, (2) during each cycle of the irrigation schedule receive data from the flow sensor, (3) and set the preset value based on the values represented in the received data from the flow sensor.

21. An apparatus comprising:

a plurality of input terminals, each input terminal configured to receive a respective control signal from an irrigation controller controlling supply of fluid to a plurality of irrigation zones by activating and deactivating, according to an irrigation schedule, a plurality irrigation valves disposed in the plurality of irrigation zones;

a plurality of output terminals, each output terminal configured to transmit one of the received control signals to at least one irrigation valve of the plurality of irrigation valves;

a signal control circuit including a plurality of switching elements, wherein each respective switching element of the plurality of switching elements couples one of the input terminals to a respective output terminal, each respective input terminal is coupled to the respective switching element, each respective output terminal is coupled to the respective switching element, and each switching element of the plurality of switching elements receives a respective control signal from the irrigation controller;

a network interface configured to wirelessly receive data from a flow sensor coupled to a master valve disposed in a main supply line of an irrigation system and through which fluid is provided to the plurality of irrigation valves in the irrigation system, wherein the flow sensor is configured to measure flow of fluid into the irrigation system during operation plurality of irrigation valves based on the irrigation schedule; and a control system coupled to the signal control circuit and the network interface, the control system configured to:

compare the fluid flow, represented by the received data, to a first preset value; and when the fluid flow is determined to exceed the first preset value, control at least one switching element of the plurality of switching elements in the signal control circuit receiving at least one of the plurality of control signals from the irrigation controller according to the irrigation schedule to decouple one or more input terminals coupled, via the at least one switching element, to the respective one or more output terminals.

22. The apparatus of claim 21, wherein the control signal is further configured to compare the fluid flow, represented by the received data, to a second preset value, and when the fluid flow is determined to be below the second preset value, control at least one switching element of the plurality of switching elements in the signal control circuit to decouple one or more input terminals coupled, via the at least one switching element, to the respective one or more output terminals.

23. The interrupt control apparatus according to claim 1, wherein each respective input terminal is directly coupled to the respective switching element, each respective output terminal is directly coupled to the respective switching element.

* * * * *